(12) United States Patent
Lutnick et al.

(10) Patent No.: US 11,397,987 B2
(45) Date of Patent: *Jul. 26, 2022

(54) SYSTEMS AND METHODS FOR PROTECTING AGAINST ERRONEOUS PRICE ENTRIES IN THE ELECTRONIC TRADING OF FINANCIAL AND OTHER INSTRUMENTS

(71) Applicant: BGC PARTNERS, INC., New York, NY (US)

(72) Inventors: Howard W. Lutnick, New York, NY (US); Kevin M. Foley, New York, NY (US); Joseph Noviello, New York, NY (US); Lon Steger, New York, NY (US); Matthew Claus, New York, NY (US); Michael Sweeting, London (GB)

(73) Assignee: BGC PARTNERS, INC., New York, NY (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/820,018

(22) Filed: Mar. 16, 2020

(65) Prior Publication Data

US 2020/0219193 A1 Jul. 9, 2020

Related U.S. Application Data

(63) Continuation of application No. 13/543,926, filed on Jul. 9, 2012, now Pat. No. 10,592,984, which is a
(Continued)

(51) Int. Cl.
*G06Q 40/04* (2012.01)
*G06Q 30/08* (2012.01)
*G06Q 40/06* (2012.01)

(52) U.S. Cl.
CPC ............ *G06Q 40/04* (2013.01); *G06Q 30/08* (2013.01); *G06Q 40/06* (2013.01)

(58) Field of Classification Search
CPC ......... G06Q 40/04; G06Q 30/08; G06Q 40/06
See application file for complete search history.

(56) References Cited

U.S. PATENT DOCUMENTS

| 2,134,118 A | 10/1938 | Foss |
| 3,249,919 A | 5/1966 | Scantlin |

(Continued)

FOREIGN PATENT DOCUMENTS

| AU | 691467 | 5/1998 |
| DE | 19606467 | 8/1997 |

(Continued)

OTHER PUBLICATIONS

Charles Schwab: Fast Moving Market, Feb. 1, 2001, pp. 1-5 (Year: 2001).*

(Continued)

*Primary Examiner* — Bijendra K Shrestha

(57) ABSTRACT

The invention relates to systems and methods that provide a user interface for use with an electronic trading system. The interface notifies the user that the price at which he or she may have attempted to trade has changed and presents the user with the opportunity to submit, modify or cancel the trade command. The user may configure the trading system to enable such a notification based on the time span for the price change, the number of increments of the price change, a combination thereof or any other appropriate consideration for protecting against the occurrence of erroneous price entries. Subsequent trade commands, such as those entered by third parties, may be used to validate prices and execute trades at these prices.

8 Claims, 3 Drawing Sheets

Related U.S. Application Data continuation of application No. 11/215,236, filed on Aug. 30, 2005, now Pat. No. 8,219,480.

(60) Provisional application No. 60/665,306, filed on Mar. 24, 2005.

(56) References Cited

U.S. PATENT DOCUMENTS

| | | | |
|---|---|---|---|
| 3,541,526 | A | 11/1970 | Levy et al. |
| 3,573,747 | A | 4/1971 | Adams et al. |
| 3,581,072 | A | 5/1971 | Nymeyer |
| 3,656,148 | A | 4/1972 | Belcher et al. |
| D225,858 | S | 1/1973 | Kline |
| 3,976,840 | A | 8/1976 | Cleveland et al. |
| 4,141,001 | A | 2/1979 | Suzuki et al. |
| 4,363,489 | A | 12/1982 | Chodak |
| 4,412,287 | A | 10/1983 | Braddock, III |
| 4,551,717 | A | 11/1985 | Dreher |
| 4,674,044 | A | 6/1987 | Kalmus et al. |
| 4,677,552 | A | 6/1987 | Sibley, Jr. |
| 4,698,618 | A | 10/1987 | Liuzza |
| 4,766,418 | A | 8/1988 | Dowsett |
| 4,789,928 | A | 12/1988 | Fujisaki |
| 4,799,156 | A | 1/1989 | Shavit et al. |
| 4,823,265 | A | 4/1989 | Nelson |
| 4,823,311 | A | 4/1989 | Hunter |
| 4,903,201 | A | 2/1990 | Wagner |
| 4,906,117 | A | 3/1990 | Birdwell |
| D308,693 | S | 6/1990 | Sakaguchi et al. |
| 4,951,196 | A | 8/1990 | Jackson |
| 4,980,826 | A | 12/1990 | Wagner |
| 5,038,284 | A | 8/1991 | Kramer |
| 5,050,116 | A | 9/1991 | Stahnke |
| 5,077,665 | A | 12/1991 | Silverman et al. |
| 5,101,353 | A | 3/1992 | Lupien et al. |
| D327,057 | S | 6/1992 | Gosch |
| 5,136,501 | A | 8/1992 | Silverman et al. |
| 5,150,118 | A | 9/1992 | Finkle et al. |
| 5,168,446 | A | 12/1992 | Wiseman |
| 5,181,809 | A | 1/1993 | Martin |
| 5,193,924 | A | 3/1993 | Larson |
| 5,195,031 | A | 3/1993 | Ordish |
| D335,660 | S | 5/1993 | Busch |
| 5,243,331 | A | 9/1993 | McCausland et al. |
| 5,253,940 | A | 10/1993 | Abecassis |
| 5,258,908 | A | 11/1993 | Hartheimer et al. |
| 5,297,031 | A | 3/1994 | Gutterman et al. |
| 5,297,032 | A | 3/1994 | Trojan et al. |
| 5,305,200 | A | 4/1994 | Hartheimer et al. |
| 5,339,392 | A | 8/1994 | Risberg et al. |
| D350,537 | S | 9/1994 | Smith |
| 5,347,452 | A | 9/1994 | Bay, Jr. |
| 5,361,199 | A | 11/1994 | Shoquist et al. |
| 5,367,298 | A | 11/1994 | Axthelm |
| 5,373,055 | A | 12/1994 | Ohmae et al. |
| 5,375,055 | A | 12/1994 | Togher et al. |
| 5,411,341 | A | 5/1995 | Ullman |
| 5,418,850 | A | 5/1995 | Tanji |
| 5,463,547 | A | 10/1995 | Markowtiz et al. |
| 5,579,002 | A | 11/1996 | Iggulden et al. |
| 5,615,109 | A | 3/1997 | Ordish |
| 5,640,569 | A | 8/1997 | Miller et al. |
| 5,667,319 | A | 9/1997 | Satloff |
| 5,668,358 | A | 9/1997 | Wolf et al. |
| 5,689,652 | A | 11/1997 | Lupien et al. |
| 5,710,889 | A | 1/1998 | Clark et al. |
| 5,715,402 | A | 2/1998 | Popolo |
| 5,717,989 | A | 2/1998 | Tozzoli et al. |
| 5,727,165 | A | 3/1998 | Ordish et al. |
| 5,757,292 | A | 5/1998 | Amro et al. |
| 5,774,880 | A | 6/1998 | Ginsberg |
| 5,787,402 | A | 7/1998 | Potter et al. |
| 5,794,207 | A | 8/1998 | Walker et al. |
| 5,794,219 | A | 8/1998 | Brown |
| 5,802,497 | A | 9/1998 | Manasse |
| 5,826,244 | A | 10/1998 | Huberman |
| 5,832,462 | A | 11/1998 | Midorikawa et al. |
| 5,835,896 | A | 11/1998 | Fisher et al. |
| 5,842,178 | A | 11/1998 | Giovannoli |
| 5,845,261 | A | 12/1998 | McAbian |
| 5,845,266 | A | 12/1998 | Lupien |
| 5,873,071 | A | 2/1999 | Ferstenberg et al. |
| 5,878,139 | A | 3/1999 | Rosen |
| 5,905,974 | A | 5/1999 | Fraser et al. |
| 5,905,975 | A | 5/1999 | Ausubel |
| 5,914,715 | A | 6/1999 | Sasaki |
| 5,915,209 | A | 6/1999 | Lawrence |
| 5,890,138 | A | 7/1999 | Godin |
| 5,924,082 | A | 7/1999 | Silverman et al. |
| 5,926,801 | A | 7/1999 | Matsubara et al. |
| 5,950,176 | A | 9/1999 | Keiser et al. |
| 5,963,923 | A | 10/1999 | Garber |
| 5,987,419 | A | 11/1999 | Hachino et al. |
| 6,012,040 | A * | 1/2000 | Goodwin, III ....... G06Q 20/202 705/20 |
| 6,014,627 | A | 1/2000 | Togher et al. |
| 6,016,483 | A | 1/2000 | Richard et al. |
| 6,029,146 | A | 2/2000 | Hawkins et al. |
| 6,055,504 | A | 4/2000 | Chou et al. |
| 6,058,369 | A * | 5/2000 | Rothstein ............... G06Q 30/02 705/38 |
| 6,085,168 | A | 7/2000 | Mori et al. |
| 6,098,051 | A * | 8/2000 | Lupien ................... G06Q 40/12 705/36 R |
| 6,115,698 | A | 9/2000 | Tuck |
| 6,119,101 | A | 9/2000 | Peckover |
| 6,131,085 | A | 10/2000 | Rossides |
| 6,134,535 | A | 10/2000 | Belzberg |
| 6,141,653 | A | 10/2000 | Conklin et al. |
| 6,151,588 | A | 11/2000 | Tozzoli et al. |
| 6,195,647 | B1 | 2/2001 | Martyn et al. |
| 6,199,050 | B1 | 3/2001 | Alaia et al. |
| 6,211,880 | B1 | 4/2001 | Impink, Jr. |
| 6,230,146 | B1 | 5/2001 | Alaia et al. |
| 6,230,147 | B1 | 5/2001 | Alaia et al. |
| 6,243,691 | B1 | 6/2001 | Fisher et al. |
| 6,247,000 | B1 | 6/2001 | Hawkins et al. |
| 6,259,044 | B1 | 7/2001 | Paratore et al. |
| 6,263,321 | B1 | 7/2001 | Daughtery, III |
| 6,272,474 | B1 | 8/2001 | Garcia |
| 6,278,982 | B1 | 8/2001 | Korhammer et al. |
| 6,282,521 | B1 | 8/2001 | Howorka |
| 6,311,178 | B1 | 10/2001 | Bi et al. |
| 6,317,727 | B1 | 11/2001 | May |
| 6,317,728 | B1 | 11/2001 | Kane |
| 6,343,278 | B1 | 1/2002 | Jain et al. |
| 6,363,365 | B1 | 3/2002 | Kou |
| 6,405,180 | B2 | 6/2002 | Tilfors et al. |
| 6,421,653 | B1 | 7/2002 | May |
| 6,434,536 | B1 | 8/2002 | Geiger |
| 6,438,575 | B1 | 8/2002 | Khan et al. |
| 6,477,513 | B1 | 11/2002 | Walker et al. |
| 6,505,174 | B1 | 1/2003 | Keiser et al. |
| 6,510,418 | B1 | 1/2003 | Case et al. |
| 6,519,574 | B1 | 2/2003 | Wilton et al. |
| 6,560,580 | B1 | 5/2003 | Fraser et al. |
| 6,618,707 | B1 * | 9/2003 | Gary ..................... G06Q 40/00 705/36 R |
| 6,625,583 | B1 | 9/2003 | Silverman et al. |
| 6,629,082 | B1 | 9/2003 | Hambrecht |
| D491,944 | S | 6/2004 | Lutnick et al. |
| 6,772,132 | B1 | 8/2004 | Kemp, II et al. |
| D496,663 | S | 9/2004 | Lutnick et al. |
| D497,912 | S | 11/2004 | Lutnick et al. |
| D498,476 | S | 11/2004 | Lutnick et al. |
| 6,823,318 | B1 | 11/2004 | Creswell et al. |
| 6,850,907 | B2 | 2/2005 | Lutnick et al. |
| D502,467 | S | 3/2005 | Lutnick et al. |
| D503,712 | S | 4/2005 | Lutnick et al. |
| D503,713 | S | 4/2005 | Lutnick et al. |
| D503,935 | S | 4/2005 | Lutnick et al. |
| D504,131 | S | 4/2005 | Lutnick et al. |
| 6,903,662 | B2 | 6/2005 | Rix et al. |
| 6,912,126 | B2 | 6/2005 | Rudd et al. |

(56) References Cited

U.S. PATENT DOCUMENTS

| | | |
|---|---|---|
| 6,963,856 B2 | 11/2005 | Lutnick et al. |
| 6,965,511 B2 | 11/2005 | Rudd et al. |
| D516,072 S | 2/2006 | Lutnick et al. |
| 7,000,181 B2 | 2/2006 | Press |
| 7,003,488 B2 | 2/2006 | Dunne et al. |
| 7,076,461 B2 | 7/2006 | Balabon |
| 7,080,033 B2 | 7/2006 | Wilton et al. |
| 7,157,651 B2 | 1/2007 | Rix et al. |
| 7,243,083 B2 | 7/2007 | Burns et al. |
| 7,283,067 B2 | 10/2007 | Lutnick et al. |
| 7,392,212 B2 | 6/2008 | Hancock et al. |
| 7,392,214 B1 | 6/2008 | Fraser et al. |
| 7,392,217 B2 | 6/2008 | Gilbert et al. |
| 7,400,270 B2 | 7/2008 | Lutnick et al. |
| 7,496,533 B1 | 2/2009 | Keith |
| 7,523,064 B2 * | 4/2009 | Burns .................. G06Q 40/04 705/37 |
| 7,552,084 B2 | 6/2009 | Fraser et al. |
| 7,617,144 B2 | 11/2009 | Madoff et al. |
| 7,617,145 B1 * | 11/2009 | Peterson .............. G06Q 30/08 705/35 |
| 7,734,529 B1 * | 6/2010 | Zhou .................... G06Q 40/06 705/37 |
| 7,769,668 B2 | 8/2010 | Balabon |
| 7,822,672 B2 * | 10/2010 | Hausman ............. G06Q 40/04 705/37 |
| 7,941,364 B2 | 5/2011 | Peterffy et al. |
| 10,223,747 B2 | 3/2019 | Gilbert et al. |
| 2001/0003179 A1 | 6/2001 | Martyn et al. |
| 2001/0032175 A1 | 10/2001 | Holden et al. |
| 2001/0037279 A1 | 11/2001 | Yeo |
| 2002/0023037 A1 | 2/2002 | White |
| 2002/0023042 A1 | 2/2002 | Solomon |
| 2002/0026321 A1 | 2/2002 | Faris et al. |
| 2002/0029180 A1 | 3/2002 | Kirwin et al. |
| 2002/0070915 A1 | 6/2002 | Mazza et al. |
| 2002/0073014 A1 | 6/2002 | Gilbert |
| 2002/0082976 A1 | 6/2002 | Howorka |
| 2002/0091626 A1 | 7/2002 | Johnson et al. |
| 2002/0107784 A1 | 8/2002 | Hancock et al. |
| 2002/0128945 A1 | 9/2002 | Moss et al. |
| 2002/0128952 A1 * | 9/2002 | Melkomian ........... G06Q 40/04 705/37 |
| 2002/0133456 A1 | 9/2002 | Lancaster et al. |
| 2002/0143690 A1 | 10/2002 | Mahajan et al. |
| 2002/0154038 A1 | 10/2002 | Houston |
| 2002/0156716 A1 | 10/2002 | Adatia |
| 2002/0161690 A1 | 10/2002 | McCarthy et al. |
| 2002/0169704 A1 | 11/2002 | Gilbert |
| 2002/0178104 A1 * | 11/2002 | Hausman ............. G06Q 40/04 705/37 |
| 2002/0198815 A1 | 12/2002 | Greifeld et al. |
| 2003/0004862 A1 | 1/2003 | Lutnick et al. |
| 2003/0009411 A1 | 1/2003 | Ram et al. |
| 2003/0033239 A1 * | 2/2003 | Gilbert ................. G06Q 40/04 705/37 |
| 2003/0050888 A1 | 3/2003 | Satow et al. |
| 2003/0065613 A1 | 4/2003 | Smith |
| 2003/0069826 A1 | 4/2003 | Guidi et al. |
| 2003/0083976 A1 | 5/2003 | McLister |
| 2003/0097323 A1 | 5/2003 | Khalfan et al. |
| 2003/0229571 A1 | 12/2003 | May |
| 2003/0229900 A1 | 12/2003 | Reisman |
| 2003/0236737 A1 | 12/2003 | Kemp et al. |
| 2004/0030634 A1 | 2/2004 | Satow |
| 2004/0034591 A1 | 2/2004 | Waelbroeck et al. |
| 2004/0044610 A1 | 3/2004 | Fraser et al. |
| 2004/0059666 A1 | 3/2004 | Waelbroeck et al. |
| 2004/0117292 A1 * | 6/2004 | Brumfield ............ G06Q 40/04 705/37 |
| 2004/0117331 A1 | 6/2004 | Lutnick et al. |
| 2004/0122684 A1 * | 6/2004 | Kaikuranta ........... H04M 15/81 705/38 |
| 2004/0140998 A1 | 7/2004 | Gravina et al. |
| 2004/0143503 A1 | 7/2004 | Suthar |
| 2004/0143538 A1 | 7/2004 | Korhammer |
| 2004/0153392 A1 * | 8/2004 | West ..................... G06Q 40/06 705/37 |
| 2004/0158519 A1 | 8/2004 | Lutnick et al. |
| 2004/0193519 A1 | 9/2004 | Sweeting et al. |
| 2004/0204232 A1 * | 10/2004 | Asher ................. G07F 17/3288 463/25 |
| 2004/0210504 A1 | 10/2004 | Rutman |
| 2004/0210511 A1 | 10/2004 | Waelbroeck et al. |
| 2004/0210512 A1 | 10/2004 | Fraser et al. |
| 2004/0218963 A1 | 11/2004 | Van Diepen et al. |
| 2004/0243505 A1 | 12/2004 | Sweeting et al. |
| 2005/0004852 A1 | 1/2005 | Whitney |
| 2005/0038731 A1 | 2/2005 | Sweeting et al. |
| 2005/0038732 A1 | 2/2005 | Sweeting et al. |
| 2005/0055304 A1 | 3/2005 | Lutnick et al. |
| 2005/0075966 A1 | 4/2005 | Duka |
| 2005/0108079 A1 | 5/2005 | Langridge |
| 2005/0108653 A1 | 5/2005 | Langridge |
| 2005/0119966 A1 | 6/2005 | Sandholm et al. |
| 2005/0160032 A1 | 7/2005 | Lutnick et al. |
| 2005/0171895 A1 | 8/2005 | Howorka et al. |
| 2005/0216393 A1 | 9/2005 | Lutnick et al. |
| 2005/0222941 A1 | 10/2005 | Tull, Jr. |
| 2006/0007160 A1 | 1/2006 | Lutnick et al. |
| 2006/0010066 A1 | 1/2006 | Rosenthal |
| 2006/0059079 A1 * | 3/2006 | Howorka .............. G06Q 40/04 705/37 |
| 2006/0069635 A1 | 3/2006 | Ram et al. |
| 2006/0080214 A1 | 4/2006 | Hausman et al. |
| 2006/0086726 A1 | 4/2006 | Yamamoto et al. |
| 2006/0200404 A1 * | 9/2006 | Stearns ................. G06Q 40/04 705/37 |
| 2006/0218072 A1 | 9/2006 | Noviello |
| 2006/0229967 A1 | 10/2006 | Sweeting |
| 2006/0265304 A1 | 11/2006 | Brumfield et al. |
| 2006/0265305 A1 | 11/2006 | Schluetter et al. |
| 2006/0271475 A1 | 11/2006 | Brumfield et al. |
| 2006/0277136 A1 | 12/2006 | O'Connor et al. |
| 2007/0100735 A1 | 5/2007 | Kemp et al. |
| 2007/0150708 A1 | 6/2007 | Billed |
| 2007/0168275 A1 | 7/2007 | Busby et al. |
| 2007/0174162 A1 | 7/2007 | Lutnick et al. |
| 2007/0226120 A1 | 9/2007 | Nanjundamoorthy |
| 2007/0244795 A1 | 10/2007 | Lutnick et al. |
| 2007/0244796 A1 | 10/2007 | Lutnick et al. |
| 2007/0250438 A1 | 10/2007 | Fraser et al. |
| 2007/0255642 A1 | 11/2007 | Keith |
| 2008/0071671 A1 | 3/2008 | Fraser et al. |
| 2008/0077523 A1 | 3/2008 | Fraser et al. |
| 2008/0133401 A1 | 6/2008 | Gilbert |
| 2008/0140558 A1 | 6/2008 | Reuter et al. |
| 2009/0073004 A1 | 3/2009 | Lutnick et al. |
| 2009/0099973 A1 | 4/2009 | Gilbert |
| 2009/0229119 A1 | 9/2009 | Daily et al. |
| 2011/0066536 A1 | 3/2011 | Milne |
| 2012/0278223 A1 | 11/2012 | Lutnick et al. |
| 2013/0132250 A1 | 5/2013 | Fraser et al. |
| 2013/0132251 A1 | 5/2013 | Fraser et al. |
| 2013/0132254 A1 | 5/2013 | Fraser et al. |
| 2014/0258078 A1 | 9/2014 | Gilbert et al. |

FOREIGN PATENT DOCUMENTS

| | | | |
|---|---|---|---|
| EP | 399850 | 11/1990 | |
| EP | 0412308 | 2/1991 | |
| EP | 0416482 | 3/1991 | |
| EP | 0512702 | 11/1992 | |
| EP | 0733963 B1 | 9/1996 | |
| EP | 0828223 A2 | 3/1998 | |
| EP | 0993995 B1 | 4/2000 | |
| EP | 1006472 | 6/2000 | |
| EP | 1686528 A2 * | 8/2006 | .......... G06Q 20/042 |
| GB | 2256954 A | 12/1992 | |
| GB | 2258061 | 1/1993 | |
| GB | 2313276 | 11/1997 | |
| JP | 358161068 | 9/1983 | |

(56) References Cited

FOREIGN PATENT DOCUMENTS

| | | |
|---|---|---|
| JP | 59184929 | 10/1984 |
| JP | 59-195779 | 11/1984 |
| JP | 62-256164 | 11/1987 |
| JP | 6-251021 | 9/1994 |
| JP | 3036207 | 4/1997 |
| JP | 11-282600 | 3/1998 |
| JP | 10-504409 | 4/1998 |
| JP | 2768828 | 6/1998 |
| JP | 10-320494 | 12/1998 |
| JP | 2003-525480 | 4/2000 |
| JP | 2002-032565 | 7/2000 |
| JP | 2001-501333 | 1/2001 |
| JP | 2016-197456 | 11/2016 |
| KR | 1992-700435 | 2/1992 |
| WO | WO 1985/004271 | 9/1985 |
| WO | WO 1987/003115 | 5/1987 |
| WO | WO 1993/015467 | 8/1993 |
| WO | WO 1995/006918 | 3/1995 |
| WO | WO 1995/026005 | 9/1995 |
| WO | WO 1996/005563 A1 | 2/1996 |
| WO | WO 1996/034356 | 10/1996 |
| WO | WO 1997/037315 | 10/1997 |
| WO | WO 97/45802 | 12/1997 |
| WO | WO 1998/026363 | 6/1998 |
| WO | WO 1998/0034187 | 8/1998 |
| WO | WO 1998/041942 | 9/1998 |
| WO | WO 1998/049639 | 11/1998 |
| WO | WO 1998/052133 | 11/1998 |
| WO | WO 1999/019821 | 4/1999 |
| WO | WO 2000/011588 | 3/2000 |
| WO | WO 2000/067172 | 4/2000 |
| WO | WO 2000/0026745 | 5/2000 |
| WO | WO 2001/050317 | 12/2000 |
| WO | WO 2001/069366 | 9/2001 |
| WO | WO 2003/026135 | 3/2003 |
| WO | WO 2004/057440 | 7/2004 |
| WO | WO 2005/059843 | 6/2005 |
| WO | WO 2005/086785 | 9/2005 |
| WO | WO 2006/108158 | 4/2006 |

OTHER PUBLICATIONS

Netessine, Serguei.:Dynamic pricing of inventory/capacty with frequent price changes, Dec. 2004, The Wharton School, Univ. of Pennsylvania , pp. 1-32. (Year: 2004).*
Money Match, Functional Specification, Version 1, The Sequor Group Inc. Software Services Aug. 1990 (87 pages).
USPTO Notice of Allowance and Fees Due for U.S. Appl. No. 09/553,423, filed Feb. 21, 2008 (7 pages).
Menzl, Vojtech, Czech Republic—Environmental Protection Equipment, National Trade Data Bank Market Reports, Jul. 13, 1995 (pp. 1-60).
Munnell, Alicia H., et al., *Mortgage Lending in Boston: Interpreting HMDA Data*, The American Economic Review, vol. 86, No. 1, Mar. 1996 (30 pages).
*Ebay*, eBay, Inc., at http://ebay.com, printed Mar. 29, 2005 (2 pages).
Sanchez, Rene, "One-Sex-Only Clubs Come Under Attack Nationwide; D.C. Antibias Law Similar to Many Others," The Washington Post, Oct. 13, 1987 (4 pages).
USPTO Notice of Allowance for U.S. Appl. No. 08/766,733, filed Sep. 1, 1998.
JP Office Action for JP Application No. 2000-590084; dated Oct. 22, 2009; 31 pages.
USPTO Office Action for U.S. Appl. No. 09/859,661; dated Dec. 14, 2009; 10 pages.
Notice of Allowance for U.S. Appl. No. 11/080,322; 7 pages; dated Feb. 26, 2010.
Futures, "Guide to Computerized Trading 2003", vol. XXXII, No. 8, 2003; pp. 1-5.
Notice of Allowance for U.S. Appl. No. 11/215,236 dated Sep. 1, 2010; 7 pages.

Anderson et al.: Hedging with a put option, Texas Agricultural Extension Services, The Texas A&M University System, Jun. 1998, pp. 1-4.
Netessine, S.: Dynamic pricing of inventory/capacity with infrequent price changes, The Wharton School, University of Pennsylvania, Sep. 2003, pp. 1-32.
Decision for U.K. Application No. 0517644.1 dated Nov. 19, 2010; 17 pages.
Office Action for U.K. Application No. 0517644.1 dated Nov. 2, 2009; 5 pages.
Definition of "protocol", Maerriam-Webster Online Dictionary, downloaded Aug. 11, 2010.
U.S. Appl. No. 09/851,848, filed May 9, 2001; 17 pages.
Notice of Allowance for U.S. Appl. No. 09/851,848 dated Apr. 25, 2008; 7 pages.
PCT Search Report for PCT Application No. PCT/US02/14825 dated Feb. 25, 2003; 4 pages.
Notice of Allowance for U.S. Appl. No. 12/031,843 dated Sep. 17, 2010; 10 pages.
PCT International Preliminary Examination Report for Application No. PCT/US02/14825 dated Dec. 13, 2005; 4 pages.
UK Examiner Report for Application No. 0326273.0 dated Jul. 23, 2004; 3 pages.
UK Examiner Report for Application No. 0326273.0 dated Jul. 11, 2005; 7 pages.
Notice of Allowance for U.S. Appl. No. 11/947,231 dated Dec. 1, 2010; 8 pages.
Notice of Allowance for U.S. Appl. No. 11/947,347 dated Nov. 29, 2010; 12 pages.
"Specialist vs. Saitori: Market-Making in New York and Tokyo"; Lindsey, Richard R., Schaede, Ulrike. Financial Analysts Journal. Charlottesville: Jul./Aug. 1992. vol. 48, Iss. 4; p. 48, 10 pgs.
"Lowering exposure to counterparty failure;" Julio Bucatinsky. Wall Street & Technology. New York: Jul. 1998. vol. 16, Issue 7; p. 110, 3 pages.
"Price Quantity Strategic Market games"; Author(s): Pradeep Dubey; Econometrica, vol. 50, No. 1 (Jan. 1982), pp. 111-126.
Notice of Allowance for U.S. Appl. No. 11/215,236 dated Dec. 1, 2010; 7 pages.
Notice of Allowance for U.S. Appl. No. 11/215,236 dated Aug. 20, 2010; 8 pages.
AU Examination Report for Application No. 2010200080 dated Nov. 23, 2010; 2 pages.
AU Examiner Report for AU Application No. 2005208492; 3 pages; dated Feb. 28, 2011.
AU Examiner Report for AU Application No. 2010214769; 2 pages; dated Apr. 7, 2011.
JP Office Action for JP Application No. 2000-590084; dated Mar. 17, 2011; 5 pages (includes English Translation).
Notice of Allowance for U.S. Appl. No. 11/947,231 dated Apr. 21, 2011; 6 pages.
Notice of Allowance for U.S. Appl. No. 11/215,236 dated Mar. 29, 2011; 25 pages.
Notice of Allowance for U.S. Appl. No. 11/947,347 dated Mar. 10, 2011; 13 pages.
EP Office Action for Application No. 05252856.9; 9 pages; dated Aug. 10, 2006.
JP Office Action for JP Application No. 2006-549572; dated May 18, 2010; 9 pages (includes English Translation).
EP Office Action for Application No. 03256926.1 dated Aug. 16, 2010; 6 pages.
Canadian Office Action for Application No. 2251259 dated May 3, 2010; 9 pages.
Canadian Office Action for Application No. 2354081 dated Jul. 2, 2009; 4 pages.
Brazilian Office Action for Application No. PI9916808-1 dated Feb. 1, 2011; 4 pages.
Canadian Office Action for Application No. 2493971 dated Apr. 7, 2009; 6 pages.
Canadian Office Action for Application No. 2371673 dated Feb. 12, 2010; 3 pages.
Chinese Office Action for Application No. 200510134147.0 dated May 9, 2011; 11 pages.

(56) References Cited

OTHER PUBLICATIONS

Notice of Allowance for U.S. Appl. No. 11/947,347; dated Jun. 27, 2011; 19 pages.
AU Examination Report for Application No. 2009238246 dated Jun. 1, 2011; 2 pages.
AU Second Examination Report for Application No. 2010214769; dated Jun. 22, 2011; 2 pages.
Notice of Allowance for U.S. Appl. No. 11/215,236 dated Jul. 29, 2011; 9 pages.
Notice of Allowance for U.S. Appl. No. 11/947,231 dated Aug. 5, 2011; 15 pages.
JP Office Action for JP Application No. 2008-549691; dated Jul. 19, 2011; 8 pages (including English Translation).
Brazilian Second Office Action for Application No. PI9916808-1 dated Aug. 18, 2011; 5 pages (includes English Translation).
Decision on Appeal for PTO Office Action for U.S. Appl. No. 10/829,119; dated Oct. 11, 2011; 10 pages.
Record of Oral Hearing for U.S. Appl. No. 10/829,119; Nov. 3, 2011; 7 pages.
Notice of Allowance for U.S. Appl. No. 11/215,236 dated Nov. 14, 2011; 8 pages.
Notice of Allowance for U.S. Appl. No. 11/947,347 dated Nov. 1, 2011; 12 pages.
Notice of Allowance for U.S. Appl. No. 11/947,231 dated Nov. 23, 2011; 7 pages.
Notice of Allowance for U.S. Appl. No. 11/947,231 dated Nov. 28, 2011; 35 pages.
Notice of Allowance for U.S. Appl. No. 12/335,951 dated Dec. 1, 2011; 9 pages.
Notice of Allowance for U.S. Appl. No. 12/031,843 dated Nov. 15, 2011; 32 pages.
Notice of Panel Decision for U.S. Appl. No. 11/760,508; 2 pages; Jul. 20, 2011.
Korean Patent Office Action for Application No. 10-2001-7007716 dated Jun. 29, 2006; 24 pages.
Chinese Office Action for Application No. 200510134147.0 dated Dec. 6, 2011; 10 pages.
Notice of Allowance for U.S. Appl. No. 11/215,236; dated Mar. 2, 2012; 13 pages.
Notice of Allowance for U.S. Appl. No. 11/947,231 dated Mar. 8, 2012; 10 pages.
Canadian Office Action for Application No. 2493971 dated Feb. 21, 2012; 7 pages.
JP Office Action for JP Application No. 2000-590084; dated Mar. 2, 2012; 5 pages (includes English Translation).
U.S. PTO Notice of Allowance for U.S. Appl. No. 10/829,119; dated Mar. 19, 2012; 10 pages.
Notice of Allowance for U.S. Appl. No. 11/947,347 dated Feb. 8, 2012; 12 pages.
Canadian Office Action for Application No. 2371673 dated Feb. 10, 2012; 2 pages.
Notice of Allowance for U.S. Appl. No. 10/382,527 dated Nov. 16, 2012; 5 pages.
U.S. PTO Notice of Allowance for U.S. Appl. No. 10/382,527; 6 pages; dated Dec. 1, 2009.
USPTO Office Action for U.S. Appl. No. 09/859,661; 11 pages; dated Sep. 6, 2012.
Zigas, David, "MSRB Rule Would Require Buyers To Accept Some Partial Deliveries" The Bond Buyer—May 16, 1983, Monday; p. 32.
Litigation Search Report Produced by the USPTO STIC, Jun. 6, 2012.
*ESpeed* v *BrokerTec_480* F.3d 1128 (2007)—CAFC, downloaded Aug. 26, 2012.
U.S. PTO Office Action for U.S. Appl. No. 11/080,322; 11 pages; dated Dec. 31, 2012.
JP Office Action for Application No. 2010-099296; 19 pages; dated Sep. 26, 2012.
CA Supplemental Analysis for CA App. No. 2,493,971; 32 pages; Jun. 28, 2013.
CA Examiner's Report for CA App. No. 2,354,081; 9 pages; dated Apr. 22, 2013.
CA Final Examiners Requisition for CA App. No. 2,251,259; 7 pages; dated May 23, 2013.
JP Office Action for JP App. No. 2011-205174; 2 pages; dated Feb. 4, 2013 (w/ English translation).
U.S. Office Action U.S. Appl. No. 13/550,011; 6 pages; dated Jul. 12, 2013.
U.S. Office Action U.S. Appl. No. 13/616,786; 6 pages; dated Jun. 13, 2013.
CA Examiner's Report for CA App. No. 2,371,673; 9 pages; dated Jun. 10, 2013.
U.S. PTO Notice of Allowance for U.S. Appl. No. 10/382,527; 6 pages; dated Aug. 23, 2013.
JP Office Action for JP App. No. 2012-12515; 7 pages; dated Jul. 24, 2013 (w/English translation).
JP Office Action for JP App. No. 2011-205174; 2 pages; dated Aug. 28, 2013.
CA Final Examiners Requisition for CA App. No. 2,251,259; 4 pages; dated Oct. 16, 2013.
JP Office Action for JP App. No. 2010-099296; 5 pages; dated Nov. 5, 2013 (w/English translation).
U.S. Office Action U.S. Appl. No. 13/550,011; 8 pages; dated Oct. 30, 2013.
U.S. Notice of Allowance for U.S. Appl. No. 13/616,786; 6 pages; dated Oct. 30, 2013.
U.S. Notice of Allowance for U.S. Appl. No. 10/3832,527; 11 pages; dated Dec. 11, 2013.
U.S. Notice of Allowance for U.S. Appl. No. 12/031,843; 18 pages; dated Dec. 26, 2013.
U.S. Notice of Allowance for U.S. Appl. No. 12/355,951; 5 pages; dated Jan. 15, 2014.
*ESpeed, Inc* v *Brokertec USA, LLC* (79 USPQ 1258; 417 FSupp2d 580) USDC DE, 2006) pp. 1259-1273.
*ESpeed, Inc* v *Brokertec USA, LLC* (82 USPQ2d 1183; 480 F3d 1129) (CAFC 2007) pp. 1184-1190.
Hamao et al., "Securities trading in the absence of dealers; Trade and Quotes on the Tokyo Stock Exchange", Working Papers Series, Graduate School of Business, Columbia University, Oct. 1992.
Ross et al., "Price Improvement of SuperDot Market Orders on the NYSE", NYSE Working paper 96-02, Mar. 11, 1996.
Charles Schwab: Fast Moving Markets, Feb. 1, 2001, Chales Schwab, Hong Kong, Ltd., pp. 1-5 (Year: 2001).
Oracle: Customizing Alerts, Feb. 1, 2001, Oracle Help Center, pp. 1=17. (Year: 2001).

\* cited by examiner

FIG. 1

| | | 120 | 112 |
|---|---|---|---|
| ASK_5 | | 109-270 | 85 |
| ASK_4 | | 109-265 | 433 |
| ASK_3 | | 109-260 | 912 |
| ASK_2 | | 109-255 | 751 |
| ASK_1 | | 109-250 | 1012 |
| BID_1 | 855 | 109-245 | |
| BID_2 | 712 | 109-240 | |
| BID_3 | 630 | 109-235 | |
| BID_4 | 251 | 109-230 | |
| BID_5 | 275 | 109-225 | |

| | | | 222 | 112 |
|---|---|---|---|---|
| ASK_5 | | | 109-270 | 85 |
| ASK_4 | | | 109-265 | 433 |
| ASK_3 | | | 109-260 | 912 |
| ASK_2 | | | 109-255 | 751 |
| ASK_1 | | | 109-250 | 1012 |
| BID_1 | 855 | 109-245 | | |
| BID_2 | 712 | 109-240 | | |
| BID_3 | 630 | 109-235 | | |
| BID_4 | 251 | 109-230 | | |
| BID_5 | 275 | 109-225 | | |

| | | | 322 | 112 | |
|---|---|---|---|---|---|
| BID_1 | 855 | 109-245 | 109-250 | 1012 | ASK_1 |
| BID_2 | 712 | 109-240 | 109-255 | 751 | ASK_2 |
| BID_3 | 630 | 109-235 | 109-260 | 912 | ASK_3 |
| BID_4 | 251 | 109-230 | 109-265 | 433 | ASK_4 |
| BID_5 | 275 | 109-225 | 109-270 | 85 | ASK_5 |

300 — 111 — 321

SYSTEMS AND METHODS FOR PROTECTING AGAINST ERRONEOUS PRICE ENTRIES IN THE ELECTRONIC TRADING OF FINANCIAL AND OTHER INSTRUMENTS

CROSS-REFERENCES TO RELATED APPLICATION

This application is a continuation of U.S. patent application Ser. No. 13/543,926 filed Jul. 9, 2012 which is a continuation of U.S. patent application Ser. No. 11/215,236, filed Aug. 30, 2005 (now U.S. Pat. No. 8,219,480 issued on Jul. 10, 2012) which claims the benefit of U.S. Provisional Application No. 60/665,306, filed Mar. 24, 2005, each of which is hereby incorporated by reference herein in its entirety.

FIELD OF THE INVENTION

This invention relates to electronic trading systems. More particularly, this invention relates to systems and methods for protecting against the occurrence of erroneous price entries in electronic trading systems.

BACKGROUND OF THE INVENTION

Much trading today involves some computer support, from simple information delivery to sophisticated trading systems that automate transactions of goods and services. Electronic trading systems and methods have gained widespread acceptance for trading of a wide variety of items ranging from financial instruments (such as stocks, bonds, currency, futures, options, etc.) to household goods (such as old records, antiques, wines, etc.).

As electronic trading becomes more popular, an increasing number of traders are in need of new systems and methods to enter trade commands in a quick, efficient and accurate manner. This is especially true given that market conditions change quickly as trades are executed at a fast pace. Price positions may therefore change rapidly and sometimes almost simultaneously. Users of such systems therefore face the risk of entering trade commands at erroneous price levels by, for example, using a mouse pointer to select a price that may have changed by the time the command is registered by the system. Such erroneous entries can lead to highly undesirable results in a rapidly changing market. Many such users are traders that track more than one active market by typically looking at multiple windows, interfaces or screens simultaneously, thereby increasing the likelihood that such erroneous entries occur.

It would be therefore desirable to provide systems and methods for protecting against the occurrence of erroneous price entries in electronic trading while ensuring that trade commands are entered in an efficient and accurate manner.

SUMMARY OF THE INVENTION

Therefore, it is an object of the invention to provide systems and methods for protecting against the occurrence of erroneous price entries in electronic trading while ensuring that trade commands are entered in an efficient and accurate manner.

This and other objects are accomplished in accordance with the principles of the invention by providing systems and methods for displaying market information for, and allowing for electronic trading in, items through a user interface. More specifically, some embodiments of the invention provide an interface for use with an electronic trading system that notifies a user that the price at which he or she may have attempted to trade has changed and by presenting the user with the opportunity to submit, modify or cancel the trade command. The user may configure the trading system to enable such a notification based on the time span for the price change, the number of increments of the price change, a combination thereof or any other appropriate consideration.

For example, the system may display on a user interface a plurality of bid and ask prices and receive a trade command from the user to hit or lift at least one price from the plurality of bid and ask prices. A determination is made as to whether the at least one price has changed by at least a predetermined number of increments from a first price to a second price and/or whether the change in price has occurred within a predetermined period of time. Based on the determination(s), the user may be presented with the opportunity to submit at least a portion of the size associated with the trade command at the second price or cancel the trade command. The predetermined number of increments and/or the predetermined period of time may be selected by the user. Subsequent trade commands by the users or third parties, such as the cancellation of existing bids and offers or the entry of new bids/offers or hit/lifts, may be used to validate prices and execute trades at these prices.

The present invention may be used in any kind of trading application, system or exchange such as auction trading systems, interactive matching systems, automated matching systems, price improvement systems, FIFO (First In, First Out) systems, RFQ (Request for Quote) systems, etc., and may be applied to the trading of any types of items. The present invention may be implemented by a trading application that is run on the user's workstation or may be implemented by the trading system on a central server linked to such workstation for processing trading commands and executing trades.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 1 is an illustration of an exemplary interface that may be displayed to users in accordance with certain embodiments of the present invention;

FIG. 2 is an illustration of an alternative embodiment of an exemplary interface that may be displayed to users in accordance with certain embodiments of the present invention;

FIG. 3 is an illustration of another alternative embodiment of an exemplary interface that may be displayed to users in accordance with certain embodiments of the present invention;

DETAILED DESCRIPTION OF THE INVENTION

Figure 4:
FIG. 4 is an illustration of yet another alternative embodiment of an exemplary interface that may be displayed to users in accordance with certain embodiments of the present invention.

The invention is directed to systems and methods that provide an interface that notifies a user that the price at which he or she may have attempted to trade has changed and by presenting the user with the opportunity to submit, modify or cancel the trade command, thereby protecting against the occurrence of erroneous price entries. Trade commands may include bid, ask, buy or sell commands that are submitted by users to a trading system. A bid may include a bid price—i.e., a dollar amount proposed to buy an issue or item—and a bid size—i.e., the volume of the particular bid. Similarly, an ask or offer may include an ask or offer price—i.e., a dollar amount proposed to sell an issue or item—and an ask or offer size—i.e., the volume of the particular ask or offer. Bids and asks are displayed by the trading system to other users who may respond to the bids and asks by submitting sell (or hit) or buy (or lift) commands to the system.

Further details of the invention are described below in relation to FIGS. 1-6.

FIG. 1 illustrates interface 100, which includes column 120 for displaying bid and ask prices, column 111 for displaying bid sizes and column 112 for displaying ask sizes. Each size that is displayed in columns 111 and 112 may be associated with a corresponding and adjacent bid or ask price in column 120. For example, a size of 855 may be associated with the highest bid price of 109-245 for which size exists—i.e., the best bid. Similarly, a size of 1012 may be associated with the lowest ask price of 109-250 for which size exists—i.e., the best ask. The best bid and ask may be referred to as the inside market.

FIG. 2 illustrates interface 200 which may differ from interface 100 at least in that the bid prices and ask prices are separated or displayed along different columns 221 and 222, respectively. The inside market is not displayed along an axis that is perpendicular to the price columns or axes. Alternatively, the best bid may be displayed alongside or adjacent to—e.g., along the same row as—the best ask. Therefore, the inside market may be displayed along a horizontal axis that is perpendicular to the vertical axes along which prices and sizes are displayed. In each of FIGS. 1 and 2, the inside market may be centered within the interface.

FIG. 3 illustrates interface 300 which may differ from interface 100 at least in that the bid prices and sizes may be displayed alongside or adjacent to—e.g. along the same rows as—the ask prices and sizes. Similar to interface 200 of FIG. 2, the bid prices and ask prices in interface 300 may be separated or displayed along different columns 321 and 322, respectively.

For FIGS. 1-3, it should be noted that, in accordance with some embodiments of this invention, price columns 120, 221, 222, 321 and 322 are dynamic. That is, the prices in these columns may change as different bids and offers are entered and trades are executed. In other words, the physical locations of the displayed prices may remain the same whereas the values displayed in the same locations may change. For example, the prices in FIGS. 2 and 3 may move up and down within each column as well as from column to column, both vertically and horizontally, based on changes in the inside market. Moreover, when the inside market changes, its location may change from a first location centered within the interface to a second location along the price columns. The inside market may then transition back to the center of the interface.

Portions of the following description of some embodiments of the present invention is discussed in connection with FIG. 1. However, the present invention may be practiced in connection with the interfaces in FIGS. 1-3 and any other interface, trading application or electronic trading system.

A user may enter trade commands to bid, offer, buy or sell at any price using a pointing device, keyboard, a combination of the same or any other appropriate input device(s). For example, the user may choose to buy at the current best ask price of 109-250 by moving a pointer to that price in column 120 and clicking an appropriate button of a pointing device. Alternatively, the user may press a BUY button on a keyboard or a trading window, which may be associated with the best bid price that is displayed. The user may choose to join the current best ask by pointing to that price and clicking on an appropriate button or pressing on an ASK button. Similarly, the user may choose to sell at the current best bid price of 109-245 by moving a pointer to that price in column 120 and clicking an appropriate button of a pointing device. Alternatively, the user may press a SELL button on a keyboard or a trading window, which may be associated with the best bid price that is displayed. The user may choose to join the current best bid by pointing to that price and clicking on an appropriate button or pressing on a BID button.

The present invention may protect the user from entering undesired or erroneous trade commands as the result of changes in such prices by adding at least one additional step to the order entry process when particular conditions are met. More specifically, the user may be notified that the price has changed and may be presented with the opportunity to submit, modify or cancel the trade command subject to time frame and/or price increment conditions. The notification may be in the form of a popup window, a sound, a combination thereof or any other appropriate method for grabbing the user's attention. The opportunity to submit, modify or cancel the trade command may also be presented through the same popup window or any other appropriate method.

For example, a user may see a price of 109.250 which he or she would like to trade at displayed in a particular location in the interface. By the time the user acts with the keyboard or mouse to enter a trade command on that price, the actual price displayed in the same location will have changed from 109-250 to 109-255. As a result, popup window 400 of FIG. 4 may be displayed to the user. In this particular example, popup window 400 may be displayed in order to confirm that the user would still desire to trade at the new price of 109-255, as displayed in window 400 or whether the user wishes to cancel his or her trade command. As shown in FIG. 4, window 400 may include an indication that the market is moving or changing at a fast pace. Alternatively, the popup window may display both the new price and size and may give the user the opportunity to modify the order by increasing or decreasing the price and/or the size displayed in the window. The user may, for example, choose to submit at least a portion of the trade at the new price level. For example, the user may choose to reduce the size of the trade. These and other examples may apply to any type of trade command entry such as limit orders, market orders and stop orders, etc.

For example, for a user entering a market order for a current market price—e.g., the best bid or best ask price— the updated current market price may be displayed to the user, and the user may be presented with an opportunity to confirm the order by submitting the trade command, to modify the order by changing the price or size of the order or to cancel the order. Similarly, when a user selects a price at which to enter an order, the updated current market price may be displayed to the user, and the user may be presented with an opportunity to confirm the order by submitting the trade command, to modify the order by changing the price or size of the order or to cancel the order, in case the price selected by the user has changed since the order was entered.

In some embodiments of the present invention, the notification may be displayed whenever the price changes, regardless of whether the change is a decrease or an increase in the price. Similarly, the user may be presented with the opportunity to submit, modify or cancel the trade command whenever the price changes, regardless of whether the change is a decrease or an increase in the price. In other embodiments, the user may be presented with the opportunity to submit, modify or cancel the trade command only when the change in price is unfavorable to the user. For example, the user may be notified of an increase in an ask price and may be presented with an opportunity to submit, modify or cancel the trade at the new ask price if the ask price has increased after the user submitted a buy (or lift) command at the previous ask price. If the ask price has decreased, the user may still be notified of the decrease in the bid price, however, he or she may not be presented with the opportunity to modify or cancel the trade command and the trade may be executed at the new price. Alternatively, the user may not be notified of the decrease in the ask price or presented with the opportunity to modify or cancel the trade command. Similarly, if the user desires to sell at a bid price that has decreased, then the user may be presented with an opportunity to submit, modify or cancel the hit trade command. If the bid price has increased, the user may still be notified of the increase in the bid price and may or may not be presented with the opportunity to modify or cancel the trade command. Alternatively, the user may not be notified of the increase in the bid price or presented with the opportunity to modify or cancel the trade command. Such notification may be implemented in response to trade commands by the user at any price or may only be implemented for select prices, such as inside market prices—i.e., when the trade command is entered on the best bid or ask price.

Figure 5:
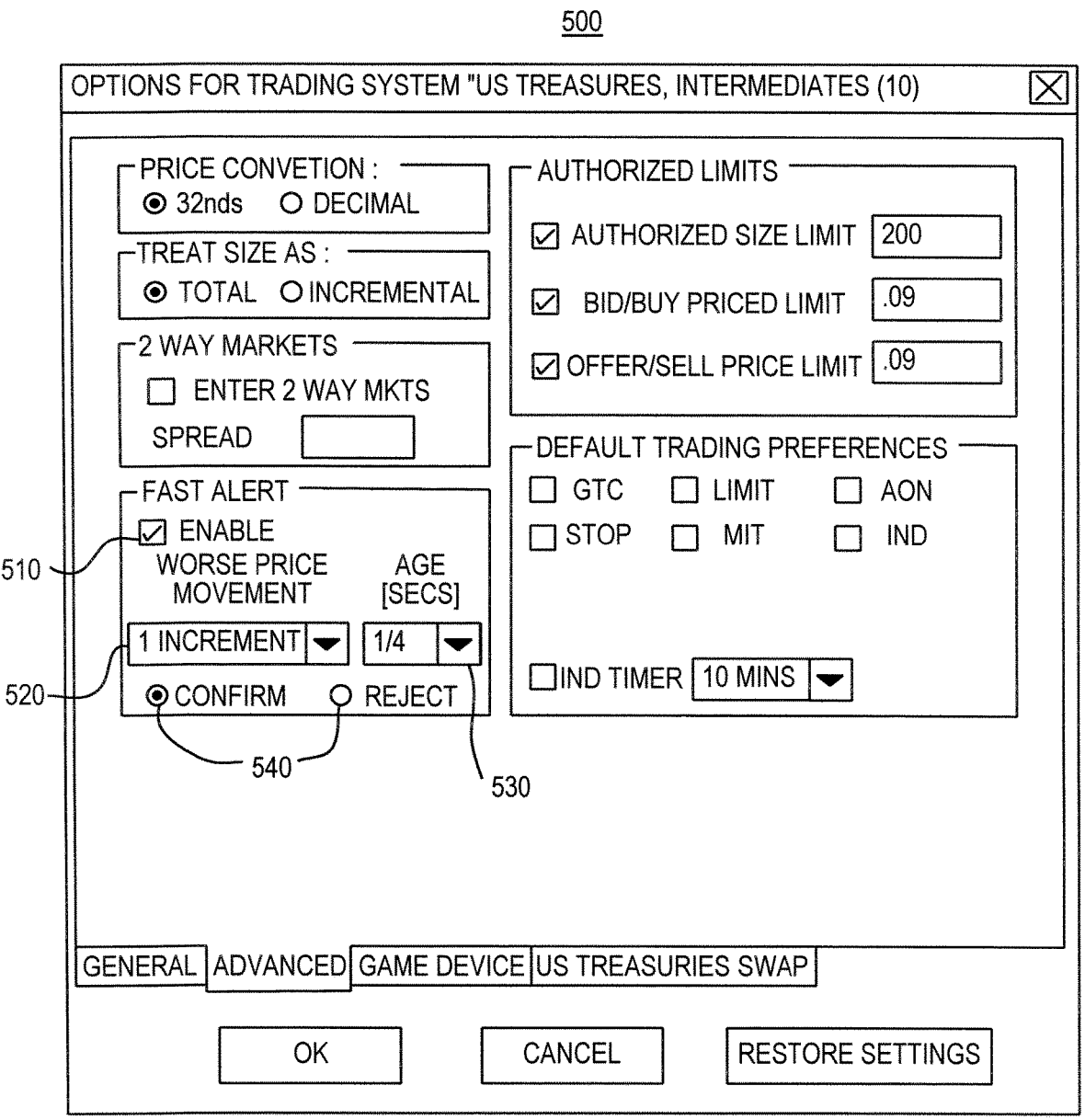
FIG. 5 is an illustration of yet another alternative embodiment of an exemplary interface that may be displayed to users in accordance with certain embodiments of the present invention.

Moreover, whether the user is notified of a price change and/or whether the user is presented with the opportunity to submit, modify or cancel the trade command may depend on other factors that may be set by the user. More specifically, the user may select options that specify conditions for which such notification may be enabled. FIG. 5 illustrates an interface in the form of window 500 which may allow the user to select such options. To implement such a feature, the system or trading application may track changes in each price level and the times at which such changes occur.

Window 500 of FIG. 5 may include fields 510, 520, 530 and 540. Field 510 allows the user to enable or disable the notification and/or the presentation of the opportunity to submit, modify or cancel the trade. Field 520 allows the user to select the number of price increments by which the price has to at least change in order to trigger the notification coupled with the opportunity to submit, modify or cancel the trade command. For example, field 520 may include a drop down menu that allows the user to specify whether the price has to change by at least one increment, two increments, three increments, etc. A single increment may correspond to the minimum allowable increment level for the particular item being traded. For example, referring back to FIG. 1, one increment may correspond to 000-005. Accordingly, if the user selects "4 increments" from the drop down menu and chooses to buy at 109-250, then the system may execute a trade for new price 109-255, 109-260 or 109-265 without presenting the user with the opportunity to submit, modify or cancel the trade command. If the new price is 109-270 or more, then the user may be presented with the opportunity to submit, modify or cancel the trade command. Alternatively, the user may enter a minimum value for the price increment by which the price has to change. The user may specify that any decrease in price, no matter how small, should trigger such notification and opportunity. The user may instead specify that any increase in price, no matter how small, should trigger such notification and opportunity. Alternatively, the user may specify that any change (increase or decrease) in price, no matter how small, should trigger such notification and opportunity.

Field 530 allows the user to select the amount of time that has passed since the change in price in order to trigger the notification coupled with the opportunity to submit, modify or cancel the trade command. For example, field 530 may include a drop down menu that allows the user to specify whether the price has to have changed within a ¼ of a second, ½ of a second, 1 second, 2 seconds, or any other amount of time. For example, referring back to FIG. 1, if the user selects "1" from the drop down menu and chooses to buy at 109-250, then the system may execute a trade at the new price without presenting the user with the opportunity to submit, modify or cancel the trade command, as long as the price change has not occurred within the past second. Alternatively, the user may enter a value for a minimum amount of time that has to elapse since the price change. The user may instead choose that such notification and opportunity should be triggered for any amount of time that has passed since the price change.

The user may choose to apply one of the two conditions selected through fields 520 and 530 or both. For example, according to the values displayed in fields 520 and 530 of FIG. 5, the user may be notified of a price change and presented with an opportunity to submit, modify or cancel a trade command if the chosen price has changed by the minimum increment allowed within the last quarter of a second.

Fields 540 allow the user to select the particular mode of notification and opportunities that may be presented to the user. For example, by choosing the "confirm" option, the visual notification given to the user may allow the user to confirm or cancel the trade command when the conditions specified in fields 520 and 530 are met. Such a visual notification may be an interface in the form of a popup window 400 shown in FIG. 4. Choosing the "reject" option may lead to the automatic cancellation, and corresponding notification, of every trade command when the conditions specified in fields 520 and 530 are met.

Figure 6:
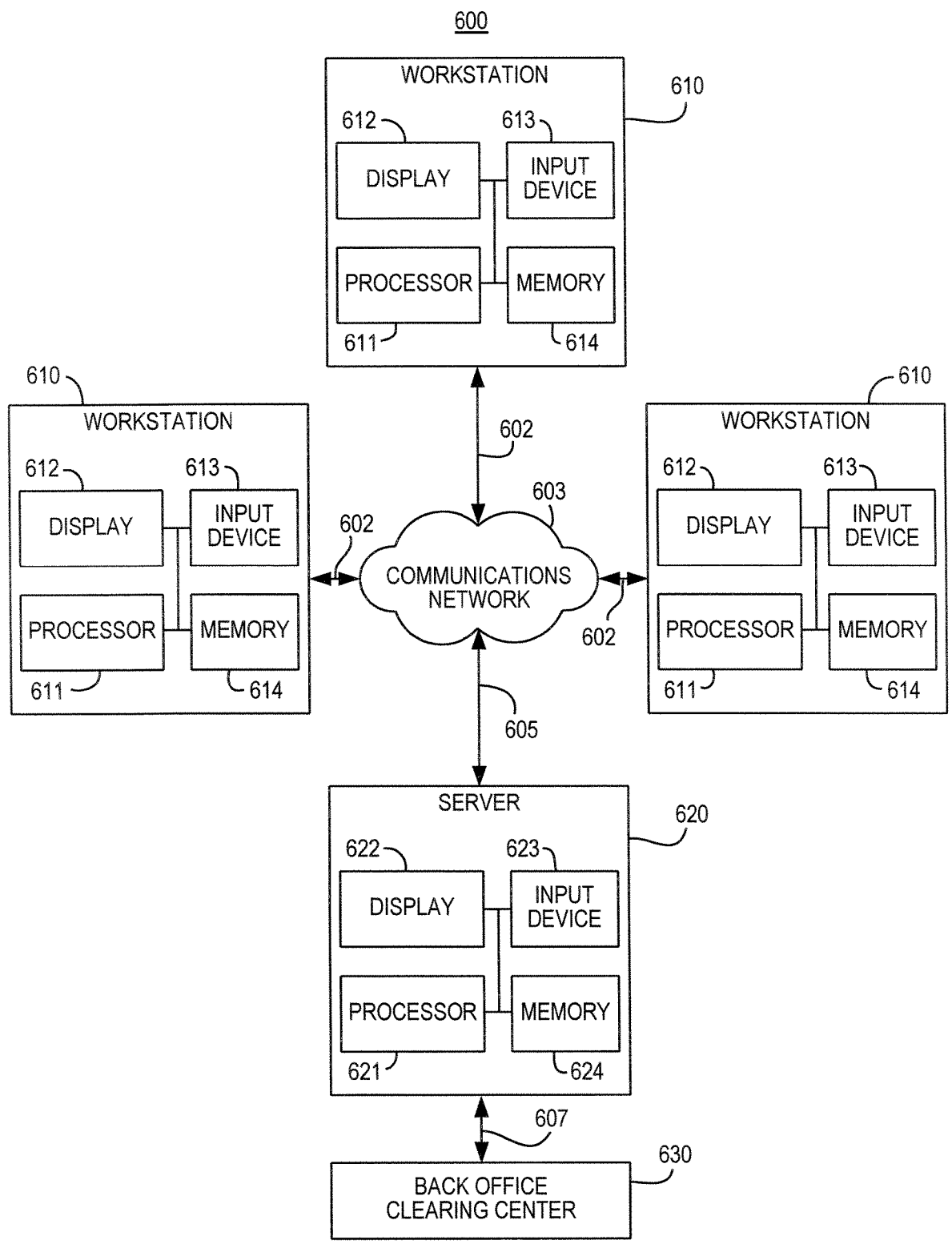
FIG. 6 is a block diagram of an exemplary system that may be used to implement the processes and functions of certain embodiments of the present invention.

Referring to FIG. 6, exemplary system 600 for implementing the invention is shown. As illustrated, system 600 may include one or more workstations 610. Workstations 610 may be local or remote, and are connected by one or more communications links 602 to communications network 603 that is linked via communications link 605 to server 620. Server 620 may be linked to back office clearing center 630 via communications link 607.

Server 620 may be any suitable server, processor, computer, data processing device, or combination of the same. Server 620 may be used to implement the governing logic that processes and executes orders and trades, and distributes trade and market information, including price and size information, to workstations 610. Communications network 603 preferably includes the Internet but may consist of any suitable computer network such as an intranet, a wide-area network (WAN), a local-area network (LAN), a wireless network, a digital subscriber line (DSL) network, a frame relay network, an asynchronous transfer mode (ATM) network, a virtual private network (VPN), or any combination of the same. Communications links 602 and 605 may be any communications links suitable for communicating data between workstations 610 and server 620, such as network links, dial-up links, wireless links, hard-wired links, etc.

Workstations 610 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 610 may be used by participants to enter, modify or cancel bid, ask, buy and sell orders for the items being traded and view market activity corresponding to these items.

A typical workstation 610 may include processor 611, display 612, input device 613, and memory 614, which may be interconnected. In a preferred embodiment, memory 614 includes a storage device for storing a workstation program for controlling processor 611. Memory 614 may also store user configuration files, as described below, and other data on the storage device. The workstation program may include a trading application for running the interfaces shown in FIGS. 1-5 and displayed on display 612. Input device 613 may be used in conjunction with display 612 by users to enter bids/asks on desired items, to execute and monitor trades by, for example, submitting, modifying or canceling hit/lift commands, and to set time frame and/or price increment conditions, as discussed above. Processor 611 may use the workstation program to receive trade information relating to the items being traded by multiple users of system 600, or other users, and display such information on display 612 or communicate such information to display 612. Processor 611 may also use the workstation program to monitor prices, receive trade commands from the user of workstation 610, register when such commands are entered, determine whether a change in price has occurred based on the prices, trade commands and time frame and/or price increment conditions, present the user with the opportunity to submit, modify or cancel the trade command as discussed above, and cancel such orders or submit them to server 620.

Server 620 may include processor 621, display 622, input device 623, and memory 624, which may be interconnected. In a preferred embodiment, memory 624 includes a storage device for storing a server program that provides the governing logic for controlling processor 621. Processor 621 may use the server program to process orders and execute trades communicated from various workstations that are operated by multiple users of system 600, or other users, and communicate trade information, as well as bid and ask information, to workstations 610 and back office clearing center 630. More specifically, processor 621 may use the server program to process orders placed by users in response to users entering commands using input device(s) 613, and execute trades based on such orders, whenever applicable. Processor 621 may also perform at least some of the functions of processor 611.

Back office clearing center 630 may be any suitable equipment, such as a computer, a laptop computer, a mainframe computer, etc., or any combination of the same, for causing trades to be settled and/or verifying that trades are settled. Communications link 607 may be any communications links suitable for communicating data between server 620 and back office clearing center 630, such as network links, dial-up links, wireless links, hard-wired links, etc.

The present invention may be practiced in embodiments that include any layout techniques, shapes or forms other than ones described above. For example, prices and sizes may be displayed along substantially circular axes rather than columns such that the resulting interactive interface represents a full circle or ellipse or at least a portion of a circle or ellipse. Moreover, the size, shape, arrangement, color, and label of various portions of the interfaces discussed or shown are examples shown for purposes of illustration only. It will be understood that modifications of any or all of the foregoing characteristics of these portions are within the scope of the invention. Embodiments discussed or shown herein may be applied to trading interfaces that use single static price axis, dual dynamic price axis, or any other suitable display.

The interfaces described herein may be used in any kind of trading application, system or exchange such as auction trading systems, interactive matching systems, automated matching systems, price improvement systems, FIFO (First In, First Out) systems, RFQ (Request for Quote) systems, etc., and may be applied to the trading of any types of items. This includes cases where users are or are not granted exclusive rights to trade, cases where users are or are not provided with a share of a trade based on their status or market role, the stage during which they start or join a trade and/or their degree or extent of participation, cases where users are or are not provided with shares of a trade on a pro-rata basis based on existing agreements or distribution algorithms, or any combination of the same.

Moreover, the trading application described herein may be any suitable, software, hardware, or both configured to implement the features of the invention. The trading application may be located at a central location (e.g., a central server such as server 620 of FIG. 6) and instances thereof may be stored on workstations connected thereto (e.g., workstations 601 of FIG. 6). In another suitable approach, the trading application may reside among different locations (e.g., a network such as communications network 603 of FIG. 6).

The trading systems and methods described above, or variation thereof, may be implemented in conjunction with the interfaces discussed or shown herein, or in conjunction with variations on those displays.

In certain embodiments of the present invention, the time period to submit, modify or cancel a trade command (which will be referred to hereafter as the "cooling off period") may be truncated based upon subsequent actions of the users who entered the trade command or other users. The following four tables and corresponding descriptions include examples of such embodiments.

| Scenario 1 | | |
|---|---|---|
| User Action | Time | System Response |
| Cancel 100.10<sup>2</sup> best bid | 0 ms | Promote 100.10 bid to best bid. Start 500 ms worse market change timer. |
| Hit best bid | 10 ms | Start 750 ms cooling off period. |
| Cancel 100.10 bid by bidder | 25 ms | Reject Cancel and immediately execute trade. |

Scenario 1 depicts an aspect of the invention that applies to the following exemplary set of circumstances: A bid to buy an item at 100.102 was listed as the best bid. The best bid is subsequently canceled thereby causing the next highest bid of 100.10 to the become the new best bid in the system. Within an exemplary time period—e.g., 500 milliseconds (ms)—following the cancellation, a user attempts to sell at the best bid by hitting the best bid in the system. Examples of order types that include attempts to sell at the best bid in the system are a sell all order, which sells to all available buy orders (a certain quantity may be specified), and a market sell order, which specifies that the user intends to sell a quantity of the item at the then available market price. In view of the fact that the 100.102 bid was cancelled within the last 500 ms, the system does not assume that the user that attempted to hit the bid would have agreed to sell at the lower present best bid of 100.10. In response to this uncertainty, the system preferably provides a user-configurable cooling off time period—e.g., 750 ms—during which the user can elect to void the trade, or at least a portion thereof. This process has been described in detail above.

Scenario 1 adds an additional feature to the method according to the present invention as follows. If, after the hit command is received against the 100.10 following the cancellation of the 100.102 bid, the 100.10 is canceled by the original bidder, the system may assume that the price of 100.10 is a valid price to trade. This assumption is based on the fact that the bidding party attempted to cancel. As such, the system truncates the cooling off period that was running and immediately executes the trade at the 100.10 price between the user who was attempting to hit the bid and the bidder who was attempting to cancel it. Accordingly, subsequent trade commands from the users may be used to validate the price.

Scenario 2

| User Action | Time | System Response |
| --- | --- | --- |
| Cancel 100.102 best bid | 0 ms | Promote 100.10 bid to best bid. Start 500 ms worse market change timer. |
| Hit best bid | 10 ms | Start 750 ms cooling off period. |
| Hit best bid by third party | 600 ms | Immediately execute trade received after 500 ms. Queue $2^{nd}$ sell request. |

Scenario 2 differs from Scenario 1 with respect to the reason for truncating the cooling off period and executing the trade. Whereas Scenario 1 truncates the cooling off period and executes the trade immediately in response to an attempt to cancel the 100.10 bid, scenario 2 truncates the cooling off period and executes the trade in response to receiving an additional hit at the 100.10 price. In this scenario, the fact that a third party attempted to sell at the 100.10 price validates the existing price.

Preferably, the cooling off period is not truncated and the trade is not executed unless the additional attempt to sell is received following the expiration of the original 500 ms that starts running when the 100.102 bid is canceled. Otherwise, the additional hit command may also have been entered in response to the 100.102 bid and not the 100.10 bid.

Scenario 3

| User Action | Time | System Response |
| --- | --- | --- |
| Cancel 100.102 best | 0 ms | Promote 100.10 bid to best bid. Start 500 ms worse market change |

-continued

Scenario 3

| User Action | Time | System Response |
| --- | --- | --- |
| bid | | timer. |
| Hit best bid | 10 ms | Start 750 ms cooling off period. |
| Enter bid at 100.102 by another. | 300 ms | Immediately execute trade at 100.102. |

Scenario 3 also differs from scenarios 1 and 2 with respect to the reason for truncating the cooling off period and executing the trade. Scenario 3 truncates the timer and executes the trade in response to the receipt of an additional bid at the original 100.102 price. In this scenario, the trade is executed at the original best bid of 100.102, as the additional bid at that price causes the system to assume it is valid. Preferably, the additional bid of 100.102 may cause truncation of the cooling off period if the additional bid of 100.102 is received before the trade with the lower 100.10 bid is executed—i.e., anytime before the expiration of the 750 ms cooling off period.

Scenario 4

| User Action | Time | System Response |
| --- | --- | --- |
| Cancel 100.102 best bid | 0 ms | Promote 100.10 bid to best bid. Start 500 ms worse market change timer. |
| Hit best bid | 10 ms | Start 750 ms cooling off period. |
| Enter bid at 100.10+ by another. | 300 ms | Immediately execute trade at 100.102 or 100.10+. |

Whereas scenario 3 truncates the timer and executes the trade in response to the receipt of an additional bid at the original 100.102 price, scenario 4 relates to the situation where another user bids at a price that is higher than the original best bid of 100.102—e.g., 100.10+. Such a price is higher than the highest possible price anticipated by the original seller. Accordingly, the system may execute a trade at either the 100.102 price or the 100.10+ price. Preferably, the trade is executed at 100.102 so that the new buyer is given a better (lower) price and the original seller sells at the best price that he or she could have anticipated.

As can be seen, some of the aforementioned scenarios are examples of using trade commands from other users to make assumptions about the intents of users and determine the validity of prices. For example, scenario 2 truncates the cooling off period and executes a trade between the first two users based on the receipt of the additional sell from a third party. Accordingly, the use of third-party behavior to validate and/or regulate the actions of two other parties is an additional feature of some embodiments of the present invention.

It will be understood that the foregoing is only illustrative of the principles of the invention, and that various modifications can be made by those skilled in the art without departing from the scope and spirit of the invention, and the invention is limited only by the claims that follow.

What is claimed is:
1. A method comprising:
controlling, by at least one processor:

rendering on a display device a plurality of real-time bid and ask prices that are based on real-time electronic transactions executed among a plurality of networked devices;

receiving a trade command to bid or offer at least one price specified from the plurality of real-time bid and ask prices being rendered on the display device;

determining whether a change in price of the at least one price is by at least a predetermined number of increments from a first price to a second price due to a velocity of the real-time electronic transactions executed among the plurality of networked devices;

determining whether the change in price has occurred within a predetermined period of time from receipt of the trade command due to the velocity of the real-time electronic transactions;

automatically in response to a determination that a market is moving at a type of pace which is indicated by real-time electronic market data, rendering, on the display device, a popup window displaying a third price resulting from the change in price to the at least one price with an indication that the market is moving at the type of pace;

in response to determining that the at least one price has changed by at least the predetermined number of increments and the change in price has occurred within the predetermined period of time from receipt of the trade command, rendering, on the display device, indicia selectable for automatically canceling the trade command; and responsive to selection of the indicia, automatically canceling the trade command.

2. The method of claim 1, further comprising controlling, by the at least one processor, rendering a notification that the trade command has been canceled.

3. The method of claim 1, wherein the predetermined period of time and the predetermined number of increments are configurable.

4. An apparatus comprising:
at least one processor configured to control:
rendering on a display device a plurality of real-time bid and ask prices that are based on real-time electronic transactions executed among a plurality of networked devices;

receiving a trade command to bid or offer at least one price specified from the plurality of real-time bid and ask prices being rendered on the display device;

determining whether a change in price of the at least one price is by at least a predetermined number of increments from a first price to a second price due to a velocity of the real-time electronic transactions executed among the plurality of networked devices;

determining whether the change in price has occurred within a predetermined period of time from receipt of the trade command due to the velocity of the real-time electronic transactions;

automatically in response to a determination that a market is moving at a type of pace/which is indicated by real-time electronic market data, rendering, on the display device, a popup window displaying a third price resulting from the change in price to the at least one price with an indication that the market is moving at the type of pace;

in response to determining that the at least one price has changed by at least the predetermined number of increments and the change in price has occurred within the predetermined period of time from receipt of the trade command, rendering, on the display device, indicia selectable for automatically canceling the trade command; and responsive to selection of the indicia, automatically canceling the trade command.

5. The method of claim 1, wherein the at least one processor comprises at least one of a server or a workstation.

6. The apparatus of claim 4, wherein the at least one processor comprises at least one of a server and a workstation.

7. The apparatus of claim 4, wherein the at least one processor is configured to control rendering a message that the trade command has been canceled.

8. The apparatus of claim 4, wherein the predetermined period of time and the predetermined number of increments are configurable.

* * * * *